Dec. 21, 1926.
R. RAINES
STORAGE BATTERY INDICATOR
Filed March 31, 1926
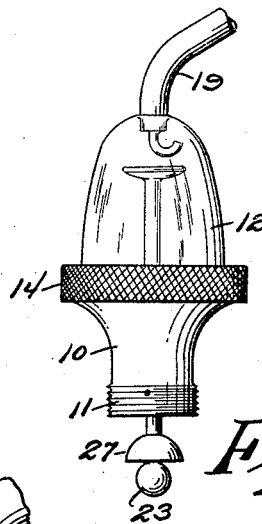
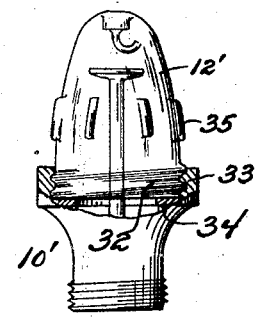
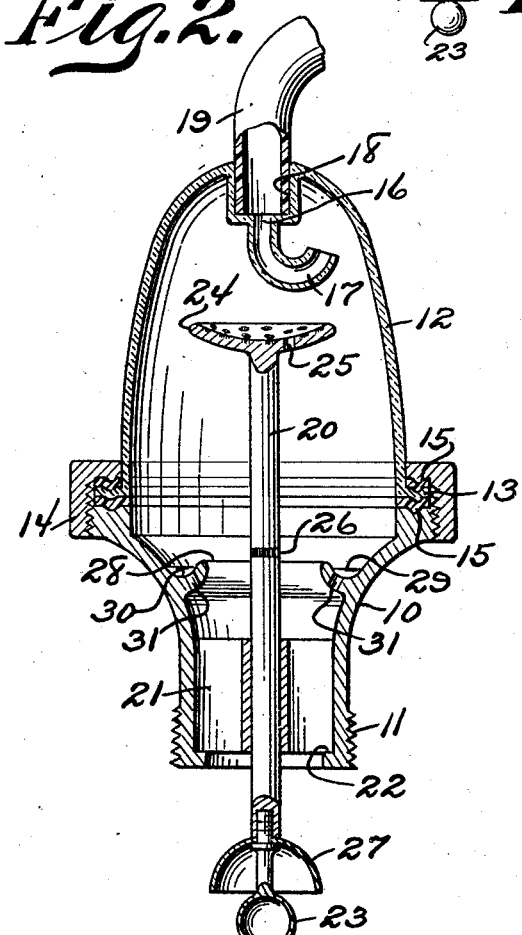
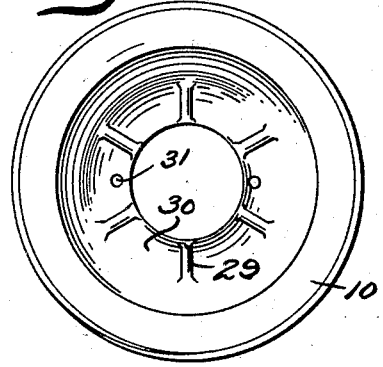
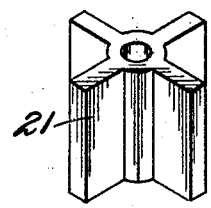
Richard Raines
INVENTOR Patented Dec. 21, 1926.

1,611,677

UNITED STATES PATENT OFFICE.

RICHARD RAINES, OF NEW YORK, N. Y., ASSIGNOR OF ONE-THIRD TO ALFRED B. HALL, OF NEW YORK, N. Y.

STORAGE-BATTERY INDICATOR.

Application filed March 31, 1926. Serial No. 98,858.

This invention relates to attachments for storage batteries and has for an object the provision of a device which may be removably secured within the filler opening of a storage battery cell to permit the escape of gases; indicate the level of the electrolyte within the cell; indicate the degree of activity of the cell, and the condition of the plates therein.

Another object of the invention is the provision of a device which, in addition to the above and other advantages, is simple in construction, reliable in use and will provide a funnel for use in filling the cell.

With the above and other objects in view, the invention further includes the following novel features and details of construction, to be hereinafter more fully described, illustrated in the accompanying drawings and pointed out in the appended claims.

In the drawings:—

Figure 1 is an elevation of the invention.

Figure 2 is an enlarged vertical sectional view of the same.

Figure 3 is a top plan view of the funnel-shaped member.

Figure 4 is a detail perspective view of the indicator guide.

Figure 5 is an elevation partly in section showing a slightly different form of the invention.

Referring to the drawings in detail wherein like characters of reference denote corresponding parts, the device as shown comprises a substantially funnel-shaped member 10 which is open at opposite ends and which is exteriorly threaded as at 11 for removable attachment within the filler opening of a storage battery cell. Secured to the member 10 is a substantially dome-shaped transparent member 12 which may be formed of glass, celluloid or the like and which is provided at its inner open end with an annular flange 13. This flange is preferably transversely channeled and provides means for securing the dome-shaped member 12 to the funnel-shaped member 10. For this purpose there is provided an annular coupling ring 14 which is exteriorly knurled and which serves to clamp compressible gaskets 15 upon opposite faces of the flange 13 and provides a leak-proof joint between the members 10 and 12.

The dome-shaped member 12 is provided in its top with an opening 16 for the escape of gases, while extending inwardly from this opening is a curved tubular projection 17. This permits of the escape of gases from the cell and prevents the splashing outward of the electrolyte from within the cell. The member 12 is preferably provided with a socket or recess 18 to receive one end of a tube 19, by means of which the gases may be conducted to any desired point.

Movable within the funnel-shaped member 10 is a stem 20 which operates through a guide 21 positioned in the member 10. This guide is shown in detail in Figure 4 of the drawings and rests upon an inwardly extending shoulder 22 located at the bottom of the funnel-shaped member. The lower end of the member 20 has secured thereto a float 23, while its upper end carries a concaved disk 24. This disk is provided with impregnated marks or dots and is designed to receive the electrolyte deflected from the walls of the dome-shaped member 12 due to the splashing of the electrolyte from the cell. The liquid will escape from the concavity of the disk through an opening 25, but the sediment will remain, so that the condition of the plates of the battery may be determined. The stem 20 is provided with a mark 26 to indicate the preferable height of the liquid within the cell.

Secured to the stem 20 near the lower end thereof is a substantially dome-shaped member 27. This member will be acted upon by the gases formed within the cell in such manner as to agitate the same and consequently the disk 24, so that the degree of activity of the cell may thus be determined.

Extending around within the member 10 is a transversely curved flange 28. This flange is provided with radially disposed ribs 29 so as to form pockets 30 designed to receive and collect sediment thrown upward by the splashing of the liquid within the cell. These pockets may be inspected at intervals and the conditions of the plates of the cell determined. Certain of the pockets are provided with openings 31 to permit the electrolyte to drain back into the cell.

In Figure 5, the dome-shaped member 12′ has its inner end provided with threads 32 for removable engagement with threads provided upon an annular flange 33 carried by the funnel-shaped member 10′. A washer or gasket 34 is clamped upon a seat provided in the funnel-shaped member so as to form a tight joint. The dome-shaped member 12 is provided with spaced lugs 35 to form grips for use in the removal and replacement of the dome-shaped member.

The invention is susceptible of various changes in its form, proportions and minor details of construction and the right is herein reserved to make such changes as properly fall within the scope of the appended claims.

Having described the invention what is claimed is:—

1. In an indicator for storage battery cells, a hollow member open at the bottom and adapted to be secured within the filler opening of the cell, a transparent portion included in said hollow member, a float level indicator located within said member and extending through the bottom thereof and designed to project into the cell, a buoyant member at the lower end of the indicator and a gas collecting element carried by the indicator, whereby the collected gases will agitate the indicator in accordance with the degree of activity of the cell.

2. In an indicator for storage battery cells, a hollow member open at the bottom and adapted to be secured within the filler opening of the cell, a transparent portion included in said hollow member, a float level indicator located within said member and extending through the bottom thereof and designed to project into the cell, a buoyant member at the lower end of the indicator and means carried by the float level indicator to be acted upon by the gases within the cell to indicate the condition of activity of the cell.

3. In an indicator for storage battery cells, a hollow member open at the bottom and adapted to be secured within the filler opening of the cell, a transparent portion included in said hollow member, said portion having an escape opening in the top thereof, a curved tubular projection extending inwardly from the opening, a float level indicator located within said member and extending through the bottom thereof and designed to project into the cell and a buoyant member at the lower end of the indicator.

4. An indicator for storage battery cells comprising a casing open at the bottom and having a transparent wall section, means to removably secure the casing within the filling opening of a cell, a concaved float controlled indicator member movable within the casing and arranged to provide a collecting pan and means to guide the indicator.

5. In an indicator for storage battery cells, a hollow member open at the bottom and adapted to be secured within the filler opening of the cell, a transparent portion included in said hollow member, a float level indicator located within said member and extending through the bottom thereof and designed to project into the cell, a buoyant member at the lower end of the indicator and pockets within the hollow member.

6. In an indicator for storage battery cells, a hollow member open at the bottom and adapted to be secured within the filler opening of the cell, a transparent portion included in said hollow member, a float level indicator located within said member and extending through the bottom thereof and designed to project into the cell, a buoyant member at the lower end of the indicator and pockets arranged around the inner wall of the hollow member.

7. In an indicator for storage battery cells, a movable indicator member, means to mount said member to extend one end into a cell and means carried by said end and adapted to be acted upon by the gases within the cell to move the indicator member by the action of the gases and in accordance with the degree of activity of said cell.

In testimony whereof I affix my signature.

RICHARD RAINES.